(No Model.)

E. R. BERNHAMER.
HARROW.

No. 273,246.  Patented Mar. 6, 1883.

WITNESSES:
Frank A. Jacob.
Osceola V. Hugo.

INVENTOR:
Edward R. Bernhamer
By H. P. Hood Atty.

UNITED STATES PATENT OFFICE.

EDWARD R. BERNHAMER, OF INDIANAPOLIS, INDIANA.

HARROW.

SPECIFICATION forming part of Letters Patent No. 273,246, dated March 6, 1883.

Application filed September 29, 1882. (No model.)

*To all whom it may concern:*

Be it known that I, EDWARD R. BERNHAMER, a resident of Indianapolis, in the county of Marion and State of Indiana, have invented a new and useful Improvement in Harrows, of which the following is a specification, having reference to the accompanying drawings.

The object of my invention is to produce a harrow which will easily ride over obstructions, will thoroughly pulverize the soil, which may be used in sections, and in which the angle which the teeth form with the earth is adjustable.

My invention consists in the construction and arrangement of parts, forming the hereinafter-described harrow.

The accompanying drawings illustrate my invention.

Figure 2:
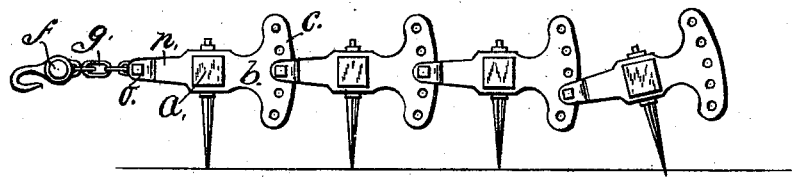
Figure 1:
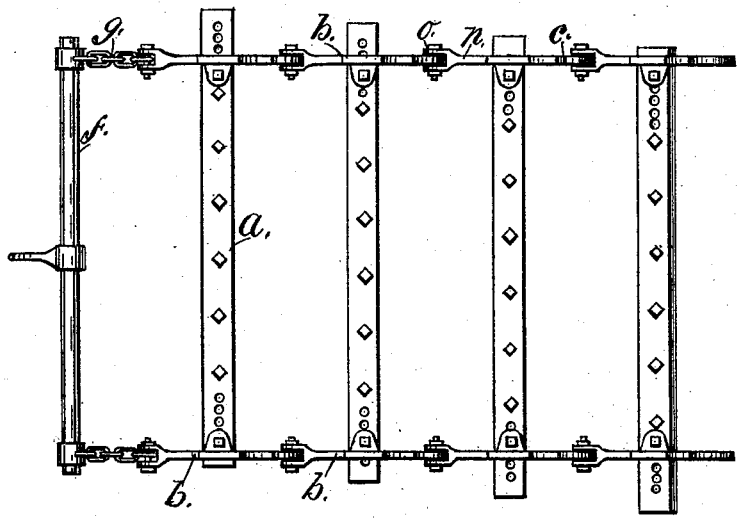

Figure 1 is a perspective view of my improved harrow. Fig. 2 is a partial-elevation, showing manner of adjusting the teeth to different angles.

Like letters refer to the same parts.

I construct my harrow of two, three, or more straight wooden beams, $a$, through which harrow-teeth of the usual form are driven. Coupling-plates $b$, of iron, are slipped upon each end of said beams. Said plates consist of a central portion, having a mortise for the reception of the end of the beam, a broad portion, $c$, having a series of holes vertically arranged, forming a clevis, and an arm, $n$, terminating in an eye, $o$, for the reception of a bolt. Said plates are provided also with lugs $d$, and are adjustably secured on the ends of the beams $a$ by means of a bolt passing through said lugs and one of a series of holes, $e$, provided in the beam for this purpose. In fastening said coupling-plates to the several beams composing the harrow I place them at different distances from the end, for the purpose of causing the harrow-teeth to stand out of line with each other, as shown, my design being to subdivide the spaces between the teeth by the number of beams. To form the harrow I take several of the beams provided with harrow-teeth and coupling-plates, as above described, and couple them together, as shown. If it is desired to have the harrow-teeth stand perpendicularly, the coupling is made with the central hole of the clevis $c$. To incline the points of the teeth forward, the coupling is made above the center, and to incline them backward the coupling is made below the center. A draft-bar, $f$, is attached to the forward beam by chains $g$, or in any other suitable manner. When the harrow is drawn forward and the points of the teeth strike an obstruction, as a stone or root, they readily yield, turning on the coupling-joints and inclining backward. When lighter work is to be done one or more of the beams can be readily uncoupled, leaving a lighter harrow, and by the adjustments before described of the inclination of the teeth and the relative position of the teeth in the several beams to each other the harrow is adapted to different kinds of work. When not in use the several sections may be rolled together, occupying but little space.

I claim as my invention—

In a harrow, the combination, with the parallel beams $a$ $a$, having the perforations $e$ $e$, of the mortised coupling-plates $b$, each provided with a clevis, $c$, arm $n$, eye $o$, and lug $d$, constructed as described, whereby the beams are flexibly connected and adapted to be longitudinally adjusted, as set forth.

EDWARD R. BERNHAMER.

Witnesses:
 H. P. HOOD,
 FRANK A. JACOB.